United States Patent
Notomista et al.

(10) Patent No.: US 11,866,079 B2
(45) Date of Patent: Jan. 9, 2024

(54) WIRE-TRAVERSING ROBOT AND METHOD OF OPERATION

(71) Applicant: Georgia Tech Research Corporation, Atlanta, GA (US)

(72) Inventors: Gennaro Notomista, Atlanta, GA (US); Magnus B. Egerstedt, Atlanta, GA (US); Yousef A. Emam, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 514 days.

(21) Appl. No.: 17/176,927

(22) Filed: Feb. 16, 2021

(65) Prior Publication Data

US 2022/0009532 A1    Jan. 13, 2022

Related U.S. Application Data

(60) Provisional application No. 62/976,641, filed on Feb. 14, 2020.

(51) Int. Cl.
*B25J 9/10*    (2006.01)
*B25J 9/12*    (2006.01)
*B61B 3/02*    (2006.01)
*B61L 3/00*    (2006.01)
*B61L 5/02*    (2006.01)
*B25J 9/04*    (2006.01)

(52) U.S. Cl.
CPC ............ *B61L 3/006* (2013.01); *B25J 9/04* (2013.01); *B25J 9/126* (2013.01); *B61B 3/02* (2013.01); *B61L 5/023* (2013.01)

(58) Field of Classification Search
CPC ... B25J 9/104; B25J 9/126; B61B 3/02; B61L 3/006; B61L 5/023
USPC ......................................................... 701/19
See application file for complete search history.

(56) References Cited

U.S. PATENT DOCUMENTS

| | | | | |
|---|---|---|---|---|
| 5,408,407 A * | 4/1995 | Lefkowitz | ............ | G05B 19/251 700/56 |
| 5,440,476 A * | 8/1995 | Lefkowitz | ............ | G05B 19/251 376/310 |
| 6,566,834 B1 * | 5/2003 | Albus | ..................... | B25J 9/1623 318/566 |
| 2020/0358277 A1 * | 11/2020 | Kewitsch | ................. | H02G 1/06 |
| 2022/0024031 A1 * | 1/2022 | Trigui | .................... | B25J 9/0081 |

FOREIGN PATENT DOCUMENTS

| | | | | |
|---|---|---|---|---|
| CN | 115614091 A | * | 1/2023 | |
| EP | 4155033 A1 | * | 3/2023 | |
| WO | WO-2019241690 A1 | * | 12/2019 | .......... B25J 15/0019 |

* cited by examiner

*Primary Examiner* — Erick R Solis
(74) *Attorney, Agent, or Firm* — Troutman Pepper Hamilton Sanders LLP; Ryan A. Schneider; Dustin B. Weeks (57) ABSTRACT

An exemplary embodiment of the present disclosure provides a robot comprising a body, a processor, and a memory. The memory further comprising instructions that, when executed by the processor cause the body to engage a first wire to support the robot from the first wire, traverse the first wire, engage a second wire simultaneously while engaging the first wire, the second wire branching from the first wire, then after engaging the second wire, disengage the first wire and traverse the second wire.

20 Claims, 6 Drawing Sheets

WIRE-TRAVERSING ROBOT AND METHOD OF OPERATION

CROSS-REFERENCE TO RELATED APPLICATIONS

This application claims the benefit of U.S. Provisional Application Ser. No. 62/976,641, filed on Feb. 14, 2020, which is incorporated herein by reference in its entirety as if fully set forth below.

GOVERNMENT LICENSE RIGHTS

This invention was made with government support under Award No. N00014-15-2115, awarded by the Office of Naval Research. The government has certain rights in the invention.

FIELD OF THE DISCLOSURE

The various embodiments of the present disclosure relate generally to robotics, and more particularly to wire-traversing robots and methods of their operation.

BACKGROUND

Using autonomous and automated technologies, like a robot, for monitoring is desirable. For example, providing monitoring for precision agriculture, structural health (e.g., infrastructure), power lines, wildlife, and the environment may be beneficial. But providing this monitoring autonomously may be difficult to achieve in an efficient and safe manner, especially when long-term monitoring solutions are required. For example, a desired monitoring area might contain terrain that is impassable for some autonomous monitoring technologies. Further, monitoring a complex area may require an autonomous technology to traverse in many directions. Additionally, the probability of failure increases as the time spent in operation increases, such as in long-term monitoring applications. A robot could avoid some terrain obstacles by traversing above the terrain such as by flight or on suspended wire. But flight is high risk and requires lots of energy to remain airborne. Additionally, traversing on a wire can require navigating obstacles or branching wires which may require a robot to disengage from the wire and thus drastically increase the risk of failure. Therefore, what is needed is a device and method for traversing a mesh of wires to provide long-term monitoring in an energy efficient and fail-safe manner.

BRIEF SUMMARY

The present disclosure relates to device and method for traversing a mesh of wires. An exemplary embodiment of the present disclosure provides a robot. The robot can comprise a body, a processor, and a memory. The memory can comprise instructions that, when executed by the processor, cause the body to engage a first wire to support the robot from the first wire, traverse the first wire, engage a second wire simultaneously while engaging the first wire, the second wire branching from the first wire, then after engaging the second wire, disengage the first wire and traverse the second wire.

In any of the embodiments disclosed herein, the body can comprise one or more body segments. Each of the one or more segments can comprise a wire-switching system. The wire-switching system can comprise a first gear. The first gear can comprise an outer perimeter, an interior cavity, and a channel. The outer perimeter can have a circumferential gap. The interior cavity can be configured to receive the first and second wires. The channel can connect the circumferential gap to the interior cavity. The channel can be configured to allow the first and second wires to exit the interior cavity.

In any of the embodiments disclosed herein, the wire-switching system can comprise a second gear. The second gear can have an outer perimeter. The outer perimeter can be configured to mesh with the outer perimeter of the first gear. The wire-switching system can comprise a gear motor. The gear motor can be configured to actuate the second gear.

In any of the embodiments disclosed herein, the first gear can be configured to move between a top opening position, a left opening position, and a right opening position. The memory can comprise instructions that, when executed by the processor, cause the first gear to be at the top opening position when traversing the first wire. The memory can comprise instructions that, when executed by the processor, cause the first gear to be at the right opening position to disengage the first wire, if the second wire branches from the first wire from a left side of the first wire relative to a direction the robot is traversing the first wire. The memory can comprise instructions that, when executed by the processor, cause the first gear to be at the left opening position to disengage the first wire, if the second wire branches from the first wire from a right side of the first wire relative to a direction the robot is traversing the first wire. The memory can comprise instructions that, when executed by the processor, cause the first gear to be at the top opening position when traversing the second wire.

In any of the embodiments disclosed herein, the one or more body segments can comprise a first body segment attached to a second body segment by an actuated hinge. The actuated hinge can be configured to align the first and second body segments with one or more wires currently being traversed by the robot.

In any of the embodiments disclosed herein, the first gear can be a C-shaped gear.

In any of the embodiments disclosed herein, the circumferential gap can be 15-25 degrees.

In any of the embodiments disclosed herein, the robot can comprise a drive motor. The robot can comprise a wheel. The drive motor can be configured to drive the wheel. The wheel can be configured to engage with a wire to allow the robot to traverse the wire.

In any of the embodiments disclosed herein, the first and second wires can be suspended.

In any of the embodiments disclosed herein, the robot can comprise a transceiver. The transceiver can be configured to communicate with one or more external devices.

Another embodiment of the present disclosure provides a method of operating a robot to traverse a system of wires. The method can comprise engaging, with a body of the robot, a first wire, traversing, with the body of the robot, the first wire, engaging, with the body of the robot, a second wire simultaneously while engaging, with the body of the robot, the first wire, the second wire branching from the first wire, then after engaging, with the body of the robot, the second wire, disengaging, with the body of the robot, the first wire, and traversing, with the body of the robot, the second wire.

In any of the embodiments disclosed herein, the body of the robot can comprise one or more body segments. Each of the one or more body segments can comprise a wire-switching system. The wire-switching system comprise a first gear. The first gear can comprise an outer perimeter, an interior cavity, and a channel. The outer perimeter can have a circumferential gap. The channel can connect the circumferential gap to the interior cavity.

In any of the embodiments disclosed herein, the engaging the first wire can comprise receiving the first wire into the interior cavity of the first gear. The engaging the second wire can comprise receiving the second wire into the interior cavity of the first gear. The disengaging the first wire can comprise passing the first wire from the interior cavity, through the channel, through the circumferential gap, and to an area external to the outer perimeter of the first gear.

In any of the embodiments disclosed herein, the first gear can be movable between a top opening position, a left opening position, and a right opening position. The method can comprise, when traversing the first wire, the first gear is at the top opening position. The method can comprise disengaging the first wire. The disengaging the first wire can comprise moving the first gear from the top opening position to the right opening position when the second wire branches from the first wire from a left side of the first wire relative to a direction the robot is traversing the first wire. The disengaging the first wire can comprise moving the first gear from the top opening position to the left opening position when the second wire branches from the first wire from a right side of the first wire relative to a direction the robot is traversing the first wire. The method can comprise, prior to traversing the second wire, moving the first gear from one of the left opening position and the right opening position to the top opening position.

In any of the embodiments disclosed herein, the wire-switching system can comprise a second gear. The second gear can have an outer perimeter meshing with the outer perimeter of the first gear. The method can comprise moving the first gear from the top opening position to the right opening position. The moving the first gear from the top opening position to the right opening position can comprise actuating the second gear. The method can comprise moving the first gear from the top opening position to the left opening position. The moving the first gear from the top opening position to the left opening position can comprise actuating the second gear.

In any of the embodiments disclosed herein, the one or more body segments can comprise a first body segment attached to a second body segment by an actuated hinge. The method can comprise actuating the actuated hinge to align the first and second body segments with the first and/or second wires currently being traversed by the robot.

In any of the embodiments disclosed herein, the first and second wires can be suspended.

In any of the embodiments disclosed herein, the method can comprise communicating, with the robot, with one or more external devices.

Another embodiment of the present disclosure provides a robot. The robot can comprise a body. The body can comprise one or more body segments. Each of the one or more segments can comprise a wire-switching system. The wire-switching system can comprise a first gear. The first gear can comprise an outer perimeter, an interior cavity, and a channel. The outer perimeter can have a circumferential gap. The interior cavity can be configured to receive the first and second wires. The channel can connect the circumferential gap to the interior cavity. The channel can be configured to allow the first and second wires to exit the interior cavity. The wire-switching system can comprise a second gear. The second gear can have an outer perimeter. The outer perimeter can be configured to mesh with the outer perimeter of the first gear. The wire-switching system can comprise a gear motor. The gear motor can be configured to actuate the second gear. The robot can comprise a processor and a memory. The memory can comprise instructions that, when executed by the processor, cause the body to engage a first wire to support the robot from the first wire, traverse the first wire, engage a second wire simultaneously while engaging the first wire, the second wire branching from the first wire, then after engaging the second wire, disengage the first wire and traverse the second wire.

In any of the embodiments disclosed herein, the second gear can be configured to actuate the first gear between a top opening position, a left opening position, and a right opening position. The memory can comprise instructions that, when executed by the processor, cause the first gear to be at the top opening position when traversing the first wire. The memory can comprise instructions that, when executed by the processor, cause the second gear to actuate the first gear to the right opening position to disengage the first wire, if the second wire branches from the first wire from a left side of the first wire relative to a direction the robot is traversing the first wire. The memory can comprise instructions that, when executed by the processor, cause the second gear to actuate the first gear to the left opening position to disengage the first wire, if the second wire branches from the first wire from a right side of the first wire relative to a direction the robot is traversing the first wire. The memory can comprise instructions that, when executed by the processor, cause the second gear to actuate the first gear to the top opening position to traverse the second wire.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
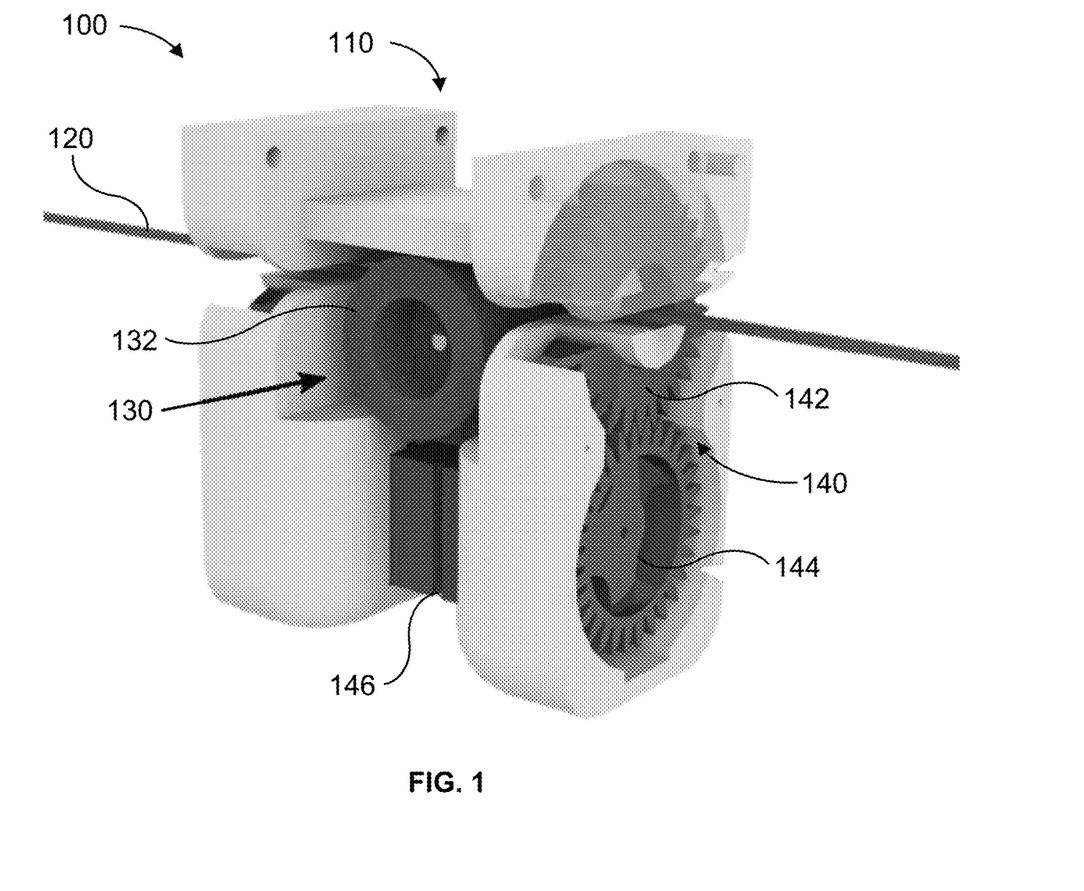
FIG. 1 provides a wire-traversing robot, in accordance with an exemplary embodiment of the present disclosure.

As shown in FIG. 1, an exemplary embodiment of the present disclosure provides a wire-traversing robot. The robot 100 is designed to traverse a wire 120. The wire 120 can include any elongated member known in the art, including, but not limited to a rope, cable, wire, chain, and the like, and any combination thereof. Additionally, the wire 120 can be suspended, such as above a surface.

The robot 100 can comprise a body 110. The body 110 can be supported by the wire 120. For example, the body 110 can engage the wire and additionally hang from the wire such that at least a portion of the body 110 is oriented above the wire 120 and at least a portion of the body 110 is oriented below the wire 120.

The body 110 can include a drive system 130 that engages with the wire 120 to allow the robot 100 to traverse the wire 120. The drive system can be many drive systems known in the art. In an exemplary embodiment, the drive system 130 can include a drive motor and a wheel 132. By way of example, the drive motor can be an any motor known in the art, including, but not limited to a servo motor, DC motor, AC motor, brushless motor, direct drive motor, and the like, and any combination thereof. The wheel 132 can be configured to engage with the wire 120 such that the rotation of the wheel 132 causes the robot 100 to traverse the wire 120. By way of example, the drive motor can cause the wheel 132 to rotate in a clockwise direction causing the robot to move along the wire 120 in a first direction and alternatively the drive motor can also cause the wheel 132 to rotate in a counter-clockwise direction causing the robot to move along the wire 120 in a second direction. Additionally, the wheel 132 can include a rim and a tire.

The body 110 can include a wire-switching system 140. The wire-switching system 140 can include a first gear 142, a second gear 144, and/or a gear motor 146. The wire-switching system 140 can allow the robot 100 to switch between wires such as when traversing a mesh of wires. For example, the mesh of wires can include wire branches where a second wire branches off from a first wire. The body 110 can include one or more wire-switching systems 140. For example, the body 110 can include two or more wire-switching systems 140.

The gear motor 146 can actuate one or more wire-switching systems 140. For example, the gear motor 146 can actuate a first and a second wire-switching system 140. The gear motor 146 can actuate the second gear 144 causing the second gear 144 to rotate and the second gear 144 rotation causing the first gear 142 to rotate. Additionally, and alternatively, the gear motor 146 can actuate the first gear 142. By way of example, the gear motor 146 can be any motor known in the art, including, but not limited to a servo motor, DC motor, AC motor, brushless motor, direct drive motor, and the like, and any combination thereof.

Figure 2A:
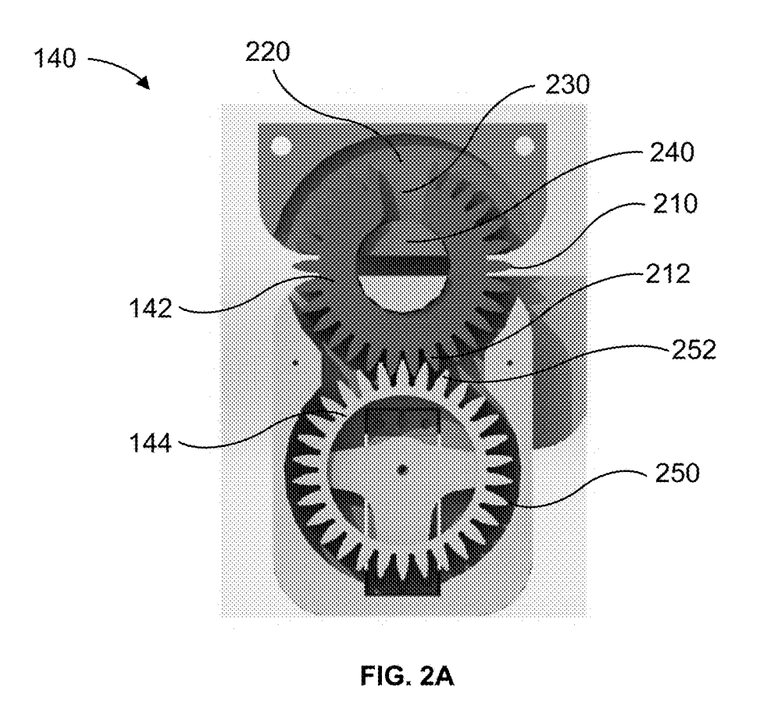
FIGS. 2A and 2B provide wire-switching systems, in accordance with an exemplary embodiment of the present disclosure.

As shown in FIG. 2A, an exemplary embodiment of the wire-switching system 140 can include a first gear 142 and a second gear 144. By way of example, the first gear 142 can include an outer perimeter 210, a circumferential gap 220, a channel 230, and an interior cavity 240. Additionally, as shown in FIG. 2A, the first gear 142 can be a C-shaped gear. By way of example, the second gear can include an outer perimeter 250. Additionally, the first gear 142 and the second gear 144 can include teeth 212 and 252 at the outer perimeter 210 and 250. The outer perimeter 210 of the first gear 142 can be configured to abut with the outer perimeter 250 of the second gear 144 such that the teeth 212 of the first gear 142 mesh with the teeth 252 of the second gear 144.

In some embodiments, the first gear 142 can have an outer perimeter 210, a circumferential gap 220, a channel 230, and an interior cavity 240, in which the components are configured so that a wire 120 can pass freely from an area external to the outer perimeter 210, through the circumferential gap 220, through the channel 230, and into the interior cavity 240. Optionally, the first gear can be configured so that a wire 120 can pass freely from the interior cavity 240, through the channel 230, through the circumferential gap 220, and into to an area external to the outer perimeter 210. The circumferential gap 220 and the channel 230 can be sized such that the wire 120 can pass through the gap freely. Additionally, the interior cavity 240 can also be configured so that a wire 120 can pass freely through the interior cavity 240. For example, the circumference of the interior cavity 240 can be larger than the circumference of the wire 120 allowing the wire 120 to pass freely through the interior cavity 240 as the robot 100 traverses the wire 120.

The circumferential gap 220 can have many different sizes in accordance with many different embodiments of the present disclosure. As persons skilled in the art would appreciate, the radial size of the opening of the circumferential gap 220 can be dependent on both a size (e.g., radius) of the first gear 142 and/or a size (e.g., radius) of the wires 120. In some exemplary embodiments, the circumferential gap 220 can have a radial opening of at least 1 degree, at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, at least 85 degrees, at least 90 degrees, at least 95 degrees, at least 100 degrees, at least 105 degrees, at least 110 degrees, at least 115 degrees, at least 120 degrees, at least 125 degrees, at least 130 degrees, at least 135 degrees, at least 140 degrees, at least 145 degrees, at least 150 degrees, at least 155 degrees, at least 160 degrees, at least 165 degrees, at least 170 degrees, at least 175 degrees, at least 180 degrees. Additionally, in some exemplary embodiments, the circumferential gap 220 can have a radial opening of less than 180 degrees, less than 175 degrees, less than 170 degrees, less than 165 degrees, less than 160 degrees, less than 155 degrees, less than 150 degrees, less than 145 degrees, less than 140 degrees, less than 135 degrees, less than 130 degrees, less than 125 degrees, less than 120 degrees, less than 115 degrees, less than 110 degrees, less than 105 degrees, less than 100 degrees, less than 95 degrees, less than 90 degrees, less than 85 degrees, less than 80 degrees, less than 75 degrees, less than 70 degrees, less than 65 degrees, less than 60 degrees, less than 55 degrees, less than 50 degrees, less than 45 degrees, less than 40 degrees, less than 35 degrees, less than 30 degrees, less than 25 degrees, less than 20 degrees, less than 15 degrees, less than 10 degrees, less than 5 degrees, less than 1 degree. Additionally, in accordance with various embodiments, the radial size of the circumferential gap 220 can have a range according to any of the values disclosed above, e.g., 1-180 degrees, 35-90 degrees, etc.

Figure 2B:
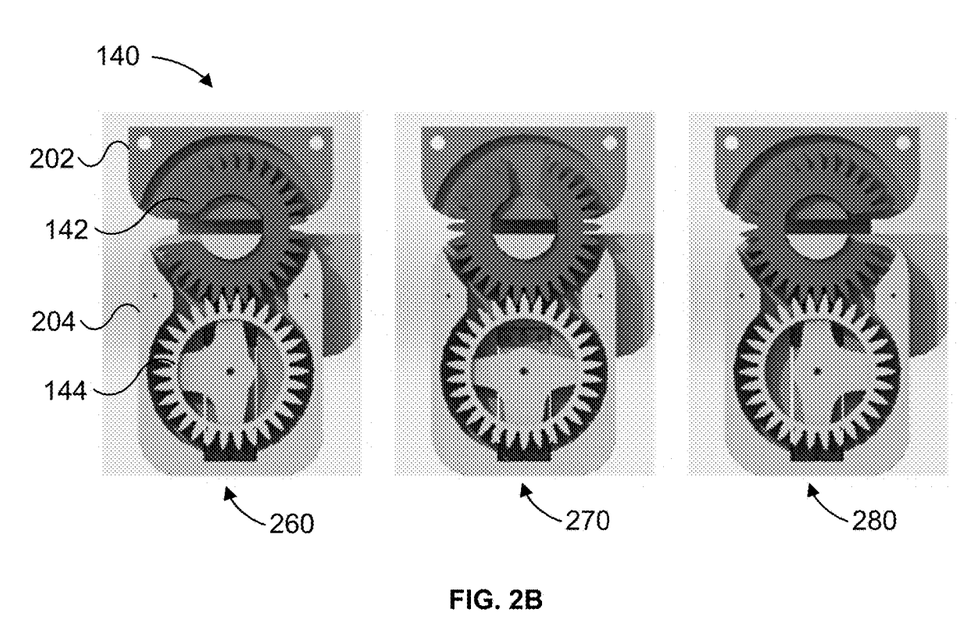

As shown in FIG. 2B, an exemplary embodiment of a wire-switching system 140 can be configured to move between a variety of gear positions to facilitate switching the robot 100 between wires. For example, the wire-switching system 140 can have a left opening position 260, a top opening position 270, and/or a right opening position 280. In the left opening position 260, the first gear 142 can be oriented such that the circumferential gap 220 is positioned to the left relative to the direction that the robot 100 is traversing the wire 120. In the top opening position 270, the first gear 142 can be oriented such that the circumferential gap 220 is positioned upward relative to the direction that the robot 100 is traversing the wire 120. By way of example, upward position relative to the direction that the robot 100 is traversing can be up away from the surface which the wire 120 can be suspended above. In the right opening position 280, the first gear 142 can be oriented such that the circumferential gap 220 is positioned to the right relative to the direction that the robot 100 is traversing the wire 120.

Figure 3:
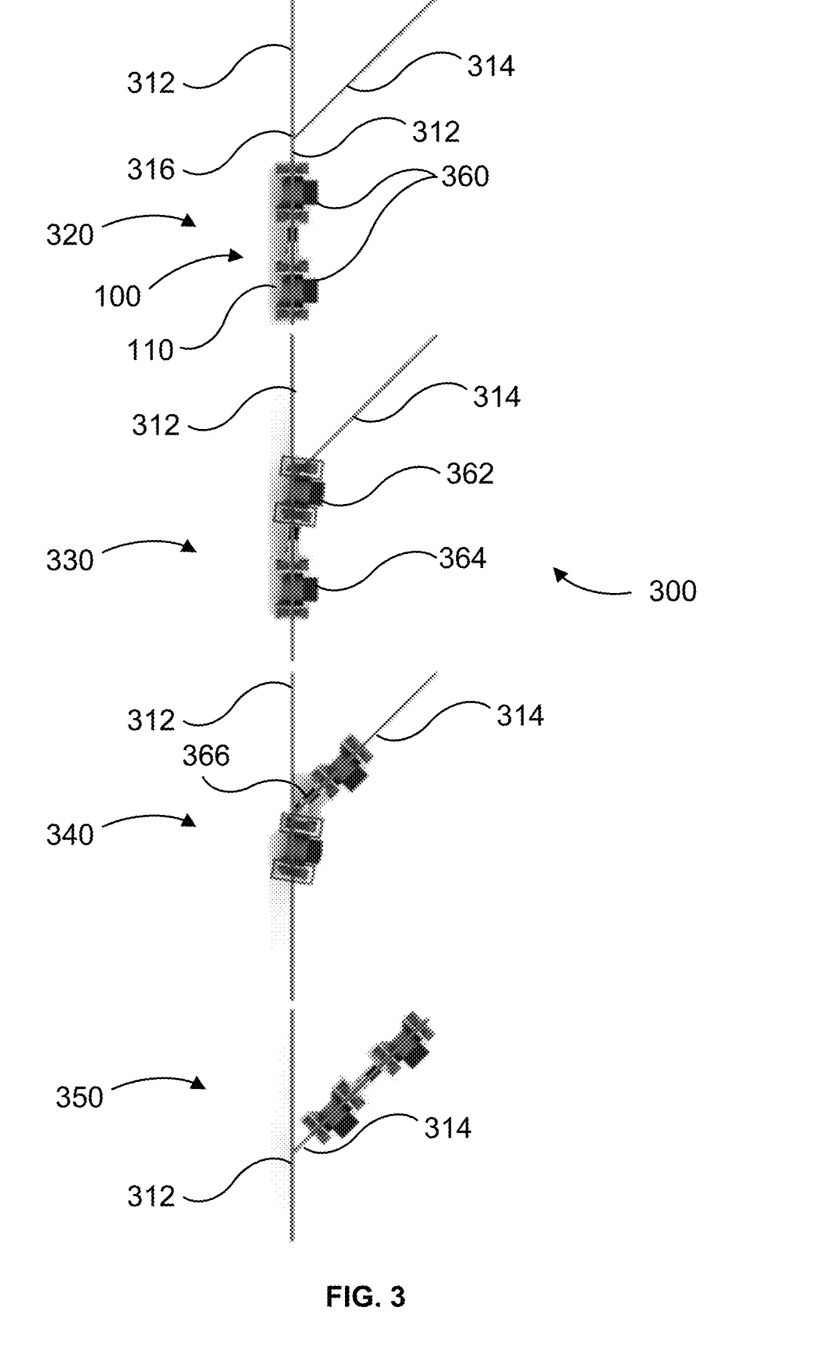
FIG. 3 provides a wire-switching method, in accordance with an exemplary embodiment of the present disclosure.

FIG. 3 illustrates an exemplary embodiment of a wire-switching method 300 for operating a robot 100 to switch between a first wire 312 and a second wire 314 at a branch 316. By way of example, the wire-switching method 300 can allow the robot 100 to traverse a first wire 312 to a branch 316 of the first wire 312 and the second wire 314 and switch to traverse the second wire 314. The branch 316 can comprise the second wire 314 branching from the first wire 312.

The wire-switching method 300 can comprise a multi-step process of switching from a first wire 312 to a second wire 314. For example, the wire-switching method can include a first step 320, a second step 330, a third step 340, and a fourth step 350. The first step 320 can include the body 110 of the robot 100 traversing the first wire 312 in a direction towards the branch 316. While traversing the first wire 312 in the direction towards the branch 316, the body 110 of the robot 100 can be engaged with the first wire 312. The second step 330 can include engaging, with the body 110 of the robot 100, a second wire 314 simultaneously while still engaging, with the body 110 of the robot 100, the first wire 312. The third step 340 can include, after engaging, with the body 110 of the robot 100, the second wire 314, disengaging, with the body 110 of the robot 100, the first wire 312. The fourth step can include the robot 100 traversing the second wire 314 while the body 110 of the robot 100 is engaged with the second wire.

As shown in FIG. 3, an exemplary embodiment of a wire-switching method 300 for operating a robot 100 to switch between a first wire 312 and a second wire 314 at a branch 316 can involve the use of a wire-switching system 140. The wire-switching system 140 can include a first gear 142. By way of example, the first gear can be a C-shaped gear configured to move between a left opening position 260, a top opening position 270, and/or a right opening position 280 (as shown in FIG. 2B). The wire-switching method 300 can include a first step 320, a second step 330, a third step 340, and a fourth step 350. The first step 320 can include the body 110 of the robot 100 traversing the first wire 312 in a direction towards the branch 316. While traversing the first wire 312 in the direction towards the branch 316, the body 110 of the robot 100 can be engaged with the first wire 312. For example, at the first step 320, the wire-switching system 140 can be in the top opening position 270 engaging the first wire 312 while traversing the first wire 312. The second step 330 can include engaging, with the body 110 of the robot 100, a second wire 314 simultaneously while still engaging, with the body 110 of the robot 100, the first wire 312. For example, at the second step 330, when the body 110 of the robot 100 engages the second wire 314, the wire-switching system 140 can remain at the top opening position 270. The third step can include, after engaging, with the body 110 of the robot 100, the second wire 314, disengaging, with the body 110 of the robot 100, the first wire 312. For example, at the third step 340, the body 110 of the robot 100 can disengage the first wire 312 while simultaneously remaining engaged with the second wire 314. To disengage the first wire 312, the wire-switching system 140 can be moved from the top opening position 270 to the left opening position 260 to allow the first wire 312 to pass from the interior cavity 240, through the channel 230, through the circumferential gap 220, and into to an area external to the outer perimeter 210. The fourth step can include the robot 100 traversing the second wire 314 while the body 110 of the robot 100 is engaged with the second wire. For example, at the fourth step 350, the wire-switching system 140 can be moved from left opening position 260 to the top opening position 270 remaining engaged with the second wire 314. This example of the wire-switching method 300 as shown in FIG. 3 and as described in this example relates to a wire-switching method 300 at a branch 316 where the second wire 314 branches from the first wire 312 from a right side of the first wire 312 relative to a direction the robot 100 is traversing the first wire 312.

As will be readily understood, the wire-switching method 300 can be mirrored, for example, to switch between wires at a wire branch that includes a first wire and a second wire branching from the first wire from a left side of the first wire relative to a direction the robot 100 is traversing the first wire. For example, the wire-switching method can include a first step, a second step, a third step, and a fourth step. The first step 320 can include the body 110 of the robot 100 traversing the first wire 312 in a direction towards the branch 316. While traversing the first wire 312 in the direction towards the branch 316, the body 110 of the robot 100 can be engaged with the first wire 312. For example, at the first step 320, the wire-switching system 140 can be in the top opening position 270 engaging the first wire 312 while traversing the first wire 312. The second step 330 can include engaging, with the body 110 of the robot 100, a second wire 314 simultaneously while still engaging, with the body 110 of the robot 100, the first wire 312. For example, at the second step 330, when the body 110 of the robot 100 engages the second wire 314, the wire-switching system 140 can remain at the top opening position 270. The third step can include, after engaging, with the body 110 of the robot 100, the second wire 314, disengaging, with the body 110 of the robot 100, the first wire 312. For example, at the third step 340, the body 110 of the robot 100 can disengage the first wire 312 while simultaneously remaining engaged with the second wire 314. To disengage the first wire 312, the wire-switching system 140 can be moved from the top opening position 270 to the right opening position 280 to allow the first wire 312 to pass from the interior cavity 240, through the channel 230, through the circumferential gap 220, and into to an area external to the outer perimeter 210. The fourth step can include the robot 100 traversing the second wire 314 while the body 110 of the robot 100 is engaged with the second wire. For example, at the fourth step 350, the wire-switching system 140 can be moved from right opening position 280 to the top opening position 270 remaining engaged with the second wire 314. This example of the wire-switching method relates to a wire-switching method at a wire branch where the second wire branches from the first wire from a left side of the first wire relative to a direction the robot 100 is traversing the first wire.

In some embodiments, the body 110 of the robot 100 can include one or more segments 360. For example, and as shown in FIG. 3, the body 110 can include a first segment 362 and a second segment 364. Optionally, the first segment 362 and the second segment 364 can be attached by a hinge 366. The hinge 366 can be an actuated hinge. For example, the hinge 366 can include a hinge motor. The hinge motor can be an any motor known in the art, including, but not limited to a servo motor, DC motor, AC motor, brushless motor, direct drive motor, and the like, and any combination thereof. The actuated hinge can be used to align the one or more segments 360 of the body 110. For example, the actuated hinge can align the one or more segments 360 with the wire 120 that the one or more segments 360 are currently traversing. As will be appreciated, aligning the one or more segments 360 of the body 110 with the wire 120 the one or more segments 360 are currently traversing can help the robot 100 safely and efficiently navigate a mesh of wires, especially when the one or more segments 360 switches from the wire 120 the one or more segments 360 are currently traversing, for example, at a wire branch.

As shown in FIG. 3, an exemplary embodiment of a wire-switching method 300 for operating a robot 100 to switch between a first wire 312 and a second wire 314 at a branch 316 can involve the body 110 having one or more segments 360. As shown in FIG. 3, the example of the branch 316 includes a first wire 312 and a second wire 314 branching from the first wire 312 from a right side of the first wire 312 relative to a direction the robot is traversing the first wire 312. The body 110 can include a first segment 362 and a second segment 364. Each of the segments 360 can include one or more wire-switching systems 140. The wire-switching method 300 can involve the use of a wire-switching system 140. The wire-switching system 140 can include a first gear 142. By way of example, the first gear can be a C-shaped gear configured to move between a left opening position 260, a top opening position 270, and/or a right opening position 280. The wire-switching method 300 can include a first step 320, a second step 330, a third step 340, and a fourth step 350. The first step 320 can include the body 110 of the robot 100 traversing the first wire 312 in a direction towards the branch 316. While traversing the first wire 312 in the direction towards the branch 316, the body 110 of the robot 100 can be engaged with the first wire 312. For example, at the first step 320, the wire-switching system 140 of the first segment 362 can be in the top opening position 270 engaging the first wire 312 while traversing the first wire 312. At the first step 320, the wire-switching system 140 of the second segment 364 can be in the top opening position 270 engaging the first wire 312 while traversing the first wire 312. The second step 330 can include engaging, with the body 110 of the robot 100, a second wire 314 simultaneously while engaging, with the body 110 of the robot 100, the first wire 312. For example, at the second step 330, when the first segment 362 engages the second wire 314, the wire-switching system 140 of the first segment 362 can remain at the top opening position 270. At the second step 330, the wire-switching system 140 of the second segment 364 can remain in the top opening position 270 remaining engaged with the first wire 312 while traversing the first wire 312. The third step 340 can include, after engaging, with the body 110 of the robot 100, the second wire 314, disengaging, with the body 110 of the robot 100, the first wire 312. For example, at the third step 340, the first segment 362 can first, disengage the first wire 312 while simultaneously remaining engaged with the second wire 314. To disengage the first wire 312, the wire-switching system 140 of the first segment 362 can be moved from the top opening position 270 to the left opening position 260 to allow the first wire 312 to pass from the interior cavity 240, through the channel 230, through the circumferential gap 220, and into to an area external to the outer perimeter 210 of the wire-switching system 140 of the first segment 362. Then the switching system 140 of the first segment 362 can be moved from left opening position 260 to the top opening position 270 remaining engaged with the second wire 314. At the third step 340, the second segment 364 can first, simultaneously engage the second wire 314 while still engaging the first wire 312. When the second segment 364 engages the second wire 314, the wire-switching system 140 of the second segment 364 can remain at the top opening position 270. Then the second segment 364 can disengage the first wire 312 while simultaneously remaining engaged with the second wire 314. To disengage the first wire 312, the wire-switching system 140 of the second segment 364 can be moved from the top opening position 270 to the left opening position 260 to allow the first wire 312 to pass from the interior cavity 240, through the channel 230, through the circumferential gap 220, and into to an area external to the outer perimeter 210 of the wire-switching system 140 of the second segment 364. The fourth step can include the robot 100 traversing the second wire 314 while the body 110 of the robot 100 is engaged with the second wire. For example, at the fourth step 350, the wire-switching system 140 of the first segment 362 can be in the top opening position 270 engaging the second wire 314 while traversing the second wire 314. At the fourth step 350, the wire-switching system 140 of the second segment 364 can be moved from left opening position 260 to the top opening position 270 remaining engaged with the second wire 314. This example of the wire-switching method 300 as shown in FIG. 3 and as described in this example relates to a wire-switching method 300 at a branch 316 where the second wire 314 branches from the first wire 312 from a right side of the first wire 312 relative to a direction the robot 100 is traversing the first wire 312.

As will be readily understood, the wire-switching method 300 can be mirrored, for example, to switch between wires at a wire branch that includes a first wire and a second wire branching from the first wire from a left side of the first wire relative to a direction the robot 100 is traversing the first wire. For example, the wire-switching method can include a first step, a second step, a third step, and a fourth step. The first step 320 can include the body 110 of the robot 100 traversing the first wire 312 in a direction towards the branch 316. While traversing the first wire 312 in the direction towards the branch 316, the body 110 of the robot 100 can be engaged with the first wire 312. For example, at the first step 320, the wire-switching system 140 of the first segment 362 can be in the top opening position 270 engaging the first wire 312 while traversing the first wire 312. At the first step 320, the wire-switching system 140 of the second segment 364 can be in the top opening position 270 engaging the first wire 312 while traversing the first wire 312. The second step 330 can include engaging, with the body 110 of the robot 100, a second wire 314 simultaneously while engaging, with the body 110 of the robot 100, the first wire 312. For example, at the second step 330, when the first segment 362 engages the second wire 314, the wire-switching system 140 of the first segment 362 can remain at the top opening position 270. At the second step 330, the wire-switching system 140 of the second segment 364 can remain in the top opening position 270 remaining engaged with the first wire 312 while traversing the first wire 312. The third step 340 can include, after engaging, with the body 110 of the robot 100, the second wire 314, disengaging, with the body 110 of the robot 100, the first wire 312. For example, at the third step 340, the first segment 362 can first, disengage the first wire 312 while simultaneously remaining engaged with the second wire 314. To disengage the first wire 312, the wire-switching system 140 of the first segment 362 can be moved from the top opening position 270 to the right opening position 280 to allow the first wire 312 to pass from the interior cavity 240, through the channel 230, through the circumferential gap 220, and into to an area external to the outer perimeter 210 of the wire-switching system 140 of the first segment 362. Then the switching system 140 of the first segment 362 can be moved from right opening position 280 to the top opening position 270 remaining engaged with the second wire 314. At the third step 340, the second segment 364 can first, simultaneously engage the second wire 314 while still engaging the first wire 312. When the second segment 364 engages the second wire 314, the wire-switching system 140 of the second segment 364 can remain at the top opening position 270. Then the second segment 364 can disengage the first wire 312 while simultaneously remaining engaged with the second wire 314. To disengage the first wire 312, the wire-switching system 140 of the second segment 364 can be moved from the top opening position 270 to the right opening position 280 to allow the first wire 312 to pass from the interior cavity 240, through the channel 230, through the circumferential gap 220, and into to an area external to the outer perimeter 210 of the wire-switching system 140 of the second segment 364. The fourth step can include the robot 100 traversing the second wire 314 while the body 110 of the robot 100 is engaged with the second wire. For example, at the fourth step 350, the wire-switching system 140 of the first segment 362 can be in the top opening position 270 engaging the second wire 314 while traversing the second wire 314. At the fourth step 350, the wire-switching system 140 of the second segment 364 can be moved from right opening position 280 to the top opening position 270 remaining engaged with the second wire 314. This example of the wire-switching method relates to a wire-switching method at a wire branch where the second wire branches from the first wire from a left side of the first wire relative to a direction the robot 100 is traversing the first wire.

The wire-switching method can include a method for wire-switching that allows the robot 100 to remain traversing the current wire when there are one or more branch wires. For example, the robot 100 can bypass a branch wire to remain traversing the current wire. The wire-switching method for bypassing a branch wire can include one or more steps. For examples, the method can include a first step, second step, and third step. The first step can include the body 110 of the robot 100 traversing a first wire. The second step can include the body 110 of the robot 100 remaining engaging the first wire while simultaneously bypassing a second wire, the second wire branching from the first wire. Alternatively, and additionally, the second step can include first, engaging, with the body 110 of the robot 100, a second wire simultaneously while still engaging, with the body 110 of the robot 100, the first wire. Then, after engaging, with the body 110 of the robot 100, the second wire, disengaging, with the body 110 of the robot 100, the second wire. The third step can include the body 110 of the robot 100, after bypassing the second wire, traversing the first wire.

The wire-switching method for bypassing a branch wire can involve the use of a wire-switching system 140. The wire-switching system 140 can include a first gear 142. By way of example, the first gear can be a C-shaped gear configured to move between a left opening position 260, a top opening position 270, and/or a right opening position 280 (as shown in FIG. 2B). The wire-switching method for bypassing a branch wire can include one or more steps. For examples, the method for bypassing a branch wire can include a first step, second step, and third step. The first step can include the body 110 of the robot 100 traversing the first wire in a direction towards a branch. While traversing the first wire in the direction towards the branch, the body 110 of the robot 100 can be engaged with the first wire. For example, at the first step, the wire-switching system 140 can be in the top opening position 270 engaging the first wire while traversing the first wire. The second step can include the body 110 of the robot 100 remaining engaging the first wire while simultaneously bypassing a second wire, the second wire branching from the first wire. For example, at the second step, the wire-switching system 140 can be moved from the top opening position 270 to the right opening position 280, prior to reaching the branch and while traversing past the branch, to allow the body 110 to bypass a second wire branching from the first wire while simultaneously remaining engaging the first wire. The wire-switching system 140 being in the right opening position 280 can allow the second wire to pass from the interior cavity 240, through the channel 230, through the circumferential gap 220, and into to an area external to the outer perimeter 210. Alternatively, and additionally, the second step can include first, engaging, with the body 110 of the robot 100, a second wire simultaneously while still engaging, with the body 110 of the robot 100, the first wire. Then, after engaging, with the body 110 of the robot 100, the second wire, disengaging, with the body 110 of the robot 100, the second wire. For example, at the second step when the body 110 of the robot 100 engages the second wire, the wire-switching system 140 can remain at the top opening position 270. Then, the body 110 of the robot 100 can disengage the second wire while simultaneously remaining engaged with the first wire. To disengage the first wire, the wire-switching system 140 can be moved from the top opening position 270 to the right opening position 280 to allow the first wire to pass from the interior cavity 240, through the channel 230, through the circumferential gap 220, and into to an area external to the outer perimeter 210. The third step can include the body 110 of the robot 100, after bypassing the second wire, traversing the first wire. For example, at the third step, the wire-switching system 140 can be moved from right opening position 280 to the top opening position 270 remaining engaged with the second wire 314. This example of the wire-switching method for bypassing a branch wire as described in this example relates to a wire-switching method for bypassing at a branch wire where the second wire branches from the first wire from a right side of the first wire relative to a direction the robot 100 is traversing the first wire.

As will be readily understood, the wire-switching method for bypassing a branch wire can be mirrored, for example, to bypass a branch wire at a wire branch that includes a first wire and a second wire branching from the first wire from a left side of the first wire relative to a direction the robot 100 is traversing the first wire. For examples, the method for bypassing a branch wire can include a first step, second step, and third step. The first step can include the body 110 of the robot 100 traversing the first wire in a direction towards a branch. While traversing the first wire in the direction towards the branch, the body 110 of the robot 100 can be engaged with the first wire. For example, at the first step, the wire-switching system 140 can be in the top opening position 270 engaging the first wire while traversing the first wire. The second step can include the body 110 of the robot 100 remaining engaging the first wire while simultaneously bypassing a second wire, the second wire branching from the first wire. For example, at the second step, the wire-switching system 140 can be moved from the top opening position 270 to the left opening position 260, prior to reaching the branch and while traversing past the branch, to allow the body 110 to bypass a second wire branching from the first wire while simultaneously remaining engaging the first wire. The wire-switching system 140 being in the left opening position 260 can allow the second wire to pass from the interior cavity 240, through the channel 230, through the circumferential gap 220, and into to an area external to the outer perimeter 210. Alternatively, and additionally, the second step can include first, engaging, with the body 110 of the robot 100, a second wire simultaneously while still engaging, with the body 110 of the robot 100, the first wire. Then, after engaging, with the body 110 of the robot 100, the second wire, disengaging, with the body 110 of the robot 100, the second wire. For example, at the second step when the body 110 of the robot 100 engages the second wire, the wire-switching system 140 can remain at the top opening position 270. Then, the body 110 of the robot 100 can disengage the second wire while simultaneously remaining engaged with the first wire. To disengage the first wire, the wire-switching system 140 can be moved from the top opening position 270 to the left opening position 260 to allow the first wire to pass from the interior cavity 240, through the channel 230, through the circumferential gap 220, and into to an area external to the outer perimeter 210. The third step can include the body 110 of the robot 100, after bypassing the second wire, traversing the first wire. For example, at the third step, the wire-switching system 140 can be moved from left opening position 260 to the top opening position 270 remaining engaged with the second wire 314. This example of the wire-switching method for bypassing a branch wire as described in this example relates to a wire-switching method for bypassing at a branch wire where the second wire branches from the first wire from a left side of the first wire relative to a direction the robot 100 is traversing the first wire.

The wire-switching system can include a method for wire switching when a wire branches at a sharp angle. For example, the wire branch is an acute angle wire branch such as when the second wire branching off the first wire creates an acute angle relative to a direction from which the robot 100 is traversing the first wire. For purposes of clarity, FIG. 3 illustrates the second wire branching form the first wire at an obtuse angle relative to a direction from which the robot 100 is traversing the first wire. The wire-switching method for switching to an acute branch wire can include one or more steps. For examples, the method can include a first step and a second step. The first step can include the robot 100 performing the wire-switching method for bypassing a branch wire. The second step can include the robot, after it has bypassed the acute branch wire, reversing the direction it is traversing and performing the wire-switching method 300 or similar.

The robot 100 can be configured so that it remains constantly engaged with at least one wire in case of actuator, motor, etc. failure while traversing the wire 120 or during the wire switch or bypass methods. For example, the robot 100 can include a wire-switching system 140 that can allow the robot 100 to remain hanging on the wire 120 at all time while traversing the wire 120 and while performing a wire switch or wire bypass. As will be appreciated, by remaining hanging on the wire 120 at all time, the design has fail-safeness.

The robot 100 can include a processor and a memory. By way of example, the robot 100 can include a processing unit such as an Internet of Things (IoT) enabled microcontroller. The memory can include instructions that, when executed by processor, can cause the robot 100 to actuate.

The robot 100 can include a transceiver. For example, the transceiver can communicate with one or more external devices. By way of example, the transceiver can receive a signal from an external device with instructions on where the robot should move, what to monitor, what information to transmit, etc. In addition, the transceiver can send a signal from the robot with information. For example, the transceiver can send monitoring information such as photos, video, sensor data, etc. to an external device.

The robot 100 can include one or more sensors. For example, the robot 100 can include sensors for performing monitoring and/or measuring tasks such as cameras, temperature sensors, vision and imaging sensors, particle sensors, proximity sensors, etc. The sensors can include any sensor or monitoring devices known in the art, including, but not limited to cameras, temperature sensors, vision and imaging sensors, particle sensors, proximity sensors, etc., and the like, and any combination thereof. The robot 100 can be configured so that the robot architecture allows for modular sensor attachments. For example, the robot 100 can have one or more attachment points allowing a user to attach and remove sensors as necessary for different monitoring tasks.

The robot 100 can include one or more solar panels. For example, the robot 100 can include one or more solar panels mounted on the body 110 of the robot 100. The solar panels can be used to recharge one or more batteries. For example, the solar panels can be used to recharge the one or more batteries when the light intensity is high enough.

The following examples further illustrate aspects of the present disclosure. However, they are in no way a limitation of the teachings or disclosure of the present disclosure as set forth herein.

EXAMPLES

I. Introduction

The objective of this example is to present the SlothBot 400, a wire-traversing robot capable of moving on a mesh of wires, which is envisioned for long-term environmental monitoring tasks. Long-term environmental monitoring finds its application in agricultural robotics and, more in particular, in plantation growth and health state monitoring. The SlothBot 400—whose name stems from its energy efficiency and slow pace while traversing wires—is self-sustaining in that it is equipped with a pair of solar panels 420 for autonomous charging. The mechanical design has been conceived to be simple and compact, while at the same time allowing the robot to switch between branching wires and to remain safely attached to them even during the switching maneuvers. In order to reduce the maintenance efforts and to minimize the risk of failures, robots targeting long-term applications should, in fact, be fail-safe and as simple as possible. We refer to long-term tasks as tasks that occur over extended periods of time and, in particular, which require multiple battery charges.

Figure 5:
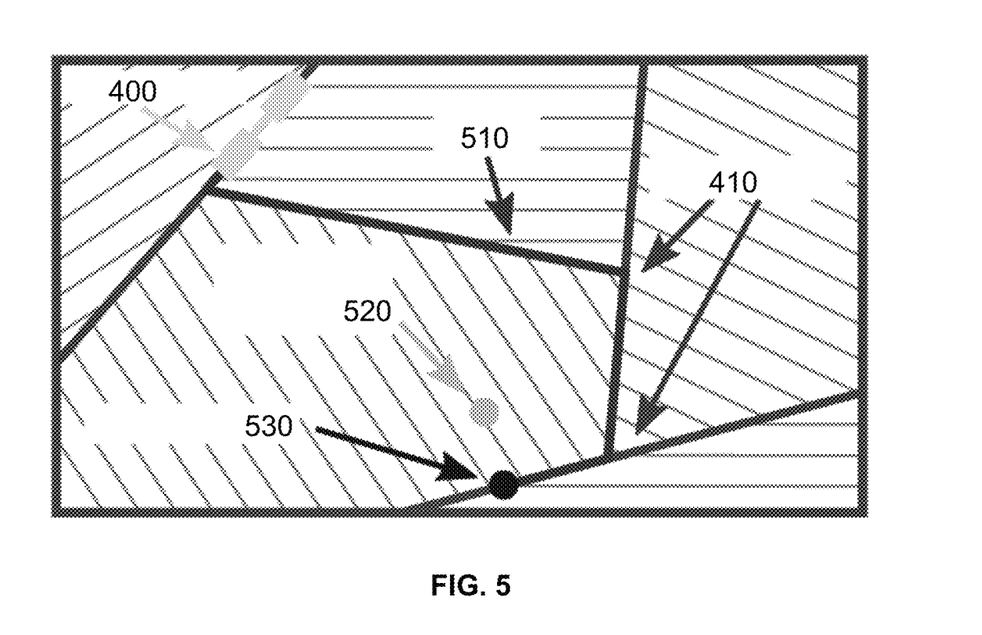
FIG. 5 provides an agricultural monitoring application, in accordance with an exemplary embodiment of the present disclosure.

As discussed, we envision one possible use being the deployment of the SlothBot 400 for long-term environmental monitoring tasks, required, for example, in agricultural robotics applications. In order to move in an agricultural field, the SlothBot 400 has to be able to traverse a mesh of wires and, therefore, to overcome crossings. FIG. 5 represents an example of a monitoring application in agricultural robotics using a wire-traversing robot (slothbot 400) in an idealized agricultural field. The crosshatched areas represent different crops in the field, while the thick lines show a mesh of wires that go across the field. The robot has to collect measurements at a point of interest 520. It, therefore, traverses the wires (on the path 510), overcoming wire crossings 410, until it reaches the goal point 530, closest to the point of interest 520. The objective of the robot deployed in the field is that of monitoring phenomena that take place over long time scales, such as crop growth. For this task to be successfully completed, energy efficiency and fail safeness are required features, so that maintenance and risk of failure are minimized. Moreover, as mentioned before, in order to be able to move on the mesh of wires across the field, the robot has to traverse intersections of wires. For this to be possible, the robot has to have the capability of switching between different wire branches.

To summarize, some of the objectives that drove the design and development of the SlothBot 400 are:
- energy efficiency
- wire-switching capability
- fail-safeness.

The remainder of this example is organized as follows. Section II describes the mechanical design of the SlothBot 400 and, in particular, the locomotion principle, the wire-switching mechanism, and the hardware architecture. Section III proposes a motion control strategy that is particularly suitable for controlling the SlothBot 400 to move on the wires. Finally, Section IV reports the results of an environmental monitoring experiment

II. Mechanical Design

Figure 4:
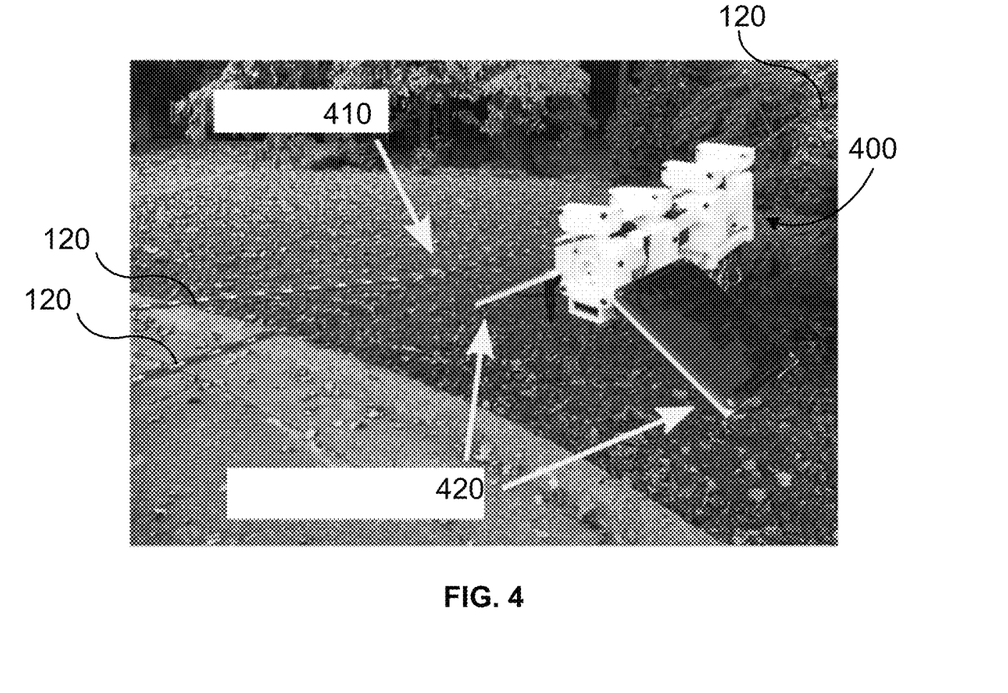
FIG. 4 provides a wire-traversing robot, in accordance with an exemplary embodiment of the present disclosure.
Figure 6:
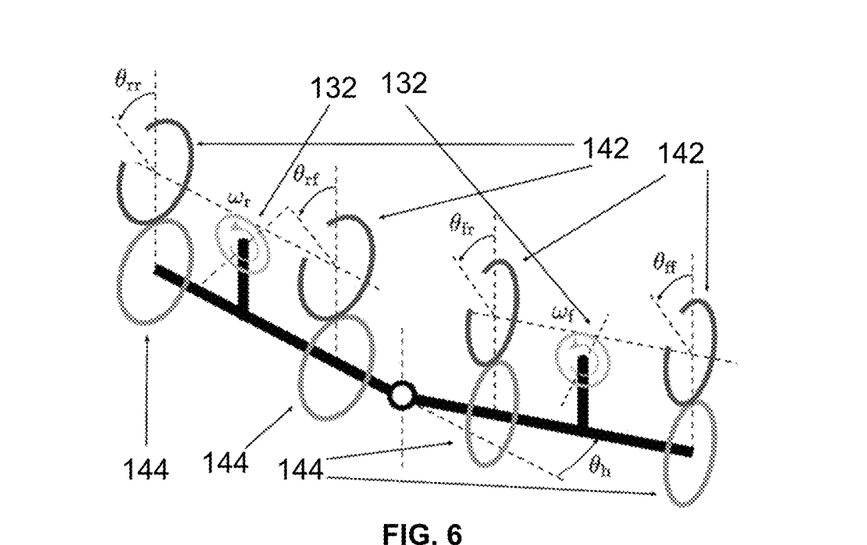
FIG. 6 provides the degrees of freedom for a wire-traversing robot, in accordance with an exemplary embodiment of the present disclosure.

The SlothBot 400, seen in FIG. 4, can be composed of two segments connected by an actuated hinge. Each segment can house a drive motor connected to a rim on which a tire is mounted. The use of wheels for locomotion is simple, energy-efficient and makes the SlothBot 400 safer when compared to brachiating robots. The switching maneuver is made possible through four pairs of spur gears. Each pair can be stacked vertically with the first gear 142 having a circumferential gap of 20°. The four gears with such a gap will be referred to as C-shaped gears throughout this example. The second gear 144 can be driven by a servo-motor and allows orienting the C-shaped gear's gap to three different positions. These positions are top, left and right, which correspond to the robot going straight, turning right and turning left, respectively. This novel wire-switching mechanism minimizes the required actuation to only one servo-motor per gear pair, thus significantly increasing the simplicity and compactness of the design. The fail-safeness of the SlothBot 400 is guaranteed through the use of the two segments connected by a hinge: this consists of a rotational joint, whose axis lies in the longitudinal plane of the robot, and it is actuated by a servo-motor. The servomotor ensures the alignment of the segments with respect to the branches they are traversing. The switching maneuver itself will be explained in more detail in Section II-B. FIG. 6 depicts the scheme of the robot highlighting its degrees of freedom. $\theta_{ff}$, $\theta_{fr}$, $\theta_{rf}$, $\theta_{rr}$ are the angles of which the front and rear first gears 142 of the front and rear segment, respectively, can rotate. These degrees of freedom are actuated by servo motors. $\theta_h$ is the relative angle between the two segments of the SlothBot 400, and is also actuated by a servo motor. $\omega_f$ and $\omega_r$ are the speeds of the 2 DC motors that move the SlothBot 400.

A. Locomotion Principle

Figure 7:
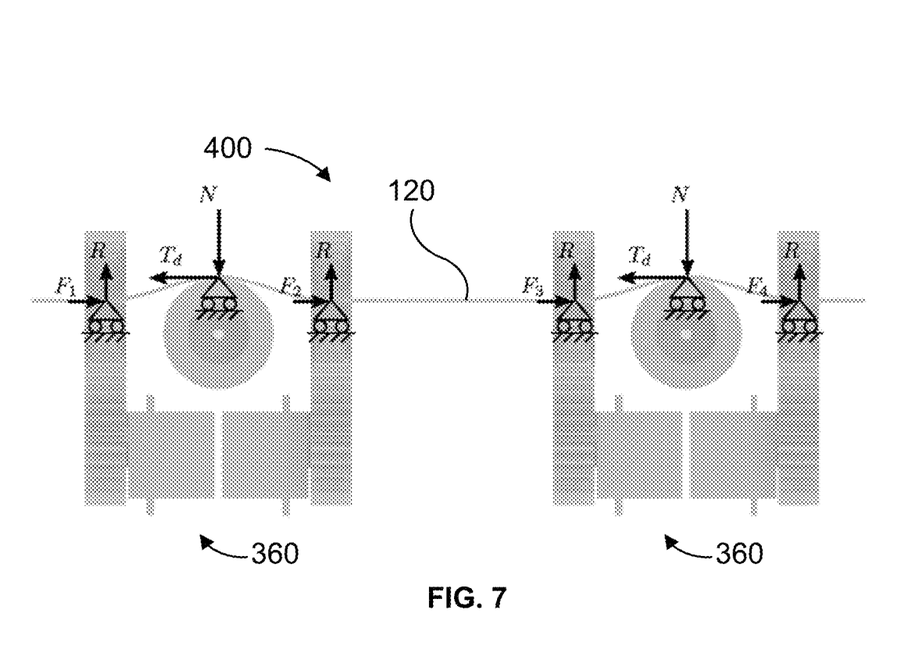
FIG. 7 provides forces involved with a wire-traversing robot, in accordance with an exemplary embodiment of the present disclosure.

The wire 120 that the SlothBot 400 has to traverse is compressed between the wheels 132 and the top portions 202 of both segments. This lets the friction force remain high enough to allow the tires to move the robot. FIG. 7 depicts the forces involved in the dynamic equilibrium of the robot. The triangular supports represent hinges/carts capable of reacting with the forces drawn in the figure. In the background of FIG. 7 the skeleton of the SlothBot 400 is shown, highlighting the contact points between its segments 360 and the wire 120. The horizontal and vertical equilibrium equations reduce to:

$$\sum_{i=1}^{4} F_i = 2T_d, \quad 2N = 4R, \qquad \text{Equation 1}$$

where $T_d$ is the force generated by the motor used for locomotion, $F_i$, i=1, ..., 4 are the horizontal reaction forces exerted by the body due to friction, and N and R are the forces and the reactions of the constraints, respectively, due to the weight of the robot and of the payload. Starting from Equation 1, we can calculate the motor torque required to carry a payload of a given mass. Let m be the mass of the payload the robot has to move around. Examples of payloads can be sensor modules or hard drives used to store collected measurements. The minimum value of motor torque $\tau$ provided by each motor that is required to move the robot along the wire is given by:

$$\tau = T_d r = 2Fr = 2\mu R r = \frac{(m+M)g}{2} \mu r \qquad \text{Equation 2}$$

where r is the effective rolling radius of the tires, $F=T_d/2$ (from Equation 1 assuming reaction forces equally distributed among the 4 support points), $\mu$ is the friction coefficient between the wires and the robot body, R the normal reaction force exerted by the supports (FIG. 7), M is the mass of the robot, and g is the acceleration due to gravity.

While moving on a mesh of wires, the SlothBot 400 has to overcome wire crossings 410 by switching to different wire branches. The switching maneuver is the subject of the next section.

B. Fail-Safe Wire Switching

Switching between different wires is required in all applications where the robot is constrained to move on a mesh of wires. The mechanism herein disclosed is robust against failures of the actuators and of the actuators' controller. More specifically, we designed the SlothBot 400 in such a way that it firmly remains on the wire in case the actuators fail during the wire switch, or in case the motors are actuated at the wrong time. This is a key feature for robotic systems designed for long-term monitoring tasks. In fact, as the probability of failures increases with time, a way of at least mitigating unsafe consequences of these failures is required. The switching method presented in this section fulfills this requirement.

FIG. 3 show a simulated wire-switching maneuver: the SlothBot 400 switches from branch (first wire 312) to branch (second wire 314). The top portions 202, that ensure that the wire is in contact with the tires, have been hidden to make the orientation of the C-shaped gears visible. The example sequence of actions performed by a robot 100 in FIG. 3 to switch to a different wire branch are as follows:

First step 320: Both segments 360 of the robot 100 are on the same wire, indicated by first wire 312, the servo motors keep all the gaps of the C-shaped gears straight up, holding the top portions 202 on the wire while not allowing the wire to disengage. The objective is switching from first wire 312 to second wire 314.

Second step 330: First segment 362 is at the junction between the wires, its C-shaped gears are both open allowing the first wire 312 to disengage from it.

Third step 340: Second segment 364 performs the same maneuver that first segment 362 completed in second step 330, disengaging from first wire 312 and moving onto second wire 314.

Fourth step 350: Both segments, 362 and 364, are on the same wire, and the robot 100 successfully switches from the first wire 312 to the second wire 314.

The described switching maneuver is made possible by the use of the C-shaped gears. In FIG. 2B the operation of these gears is shown in more detail. In order to be able to switch between branching wires, the top and bottom portions of the robot that are above and below the wires, depicted in 202 and 204, respectively, have to be disconnectable. In fact, referring to the sequence in FIG. 3, the robot 100 that has to switch from first wire 312 to branch (second wire 314), has to cross over the first wire 312. Thus, at some point in time, opening a gap between the top and bottom portions 202 and 204 is required. Nevertheless, in order to keep the robot 100 hung to the wires at any point in time, parts above and below the wires have to remain connected. The C-shaped gear allows the top and bottom portions 202 and 204 to be held together, while, at the same time, allowing the wires to disengage from the robot during wire-switching maneuvers.

In order to accomplish what has been described, an actuated decoupling mechanism is proposed. This can consists of a train of two spur gears per side per segment of the SlothBot 400. One gear (e.g., the second gear 144) is mounted on the servo motor; the other one (e.g., the first gear 142) has a C-shape that allows the top portion 202 to be held for any orientation of the gap (i.e. for any value of the angles $\theta_{fl}, \theta_{fr}, \theta_{rl}, \theta_{rr}$ of FIG. 6). At the same time, the shape of this gear allows wire branches to disengage from the left (e.g., left opening position 260) and from the right (e.g., right opening position 280) of the robot. While the robot is driving straight on a wire, the C-shaped gears are oriented as in top opening position 270.

Figure 8:
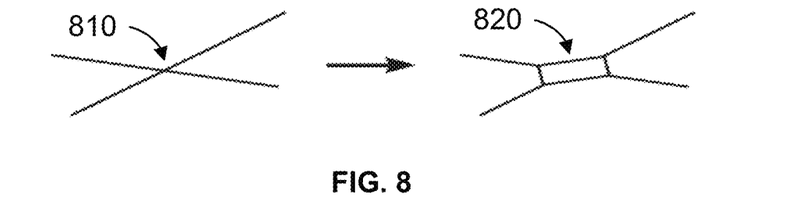
FIG. 8 provides a method for configuring branch wires, in accordance with an exemplary embodiment of the present disclosure.

The SlothBot 400, in this example, is shown traversing a crossing with 3 branching wires. However, any crossing can be turned into a sequence of 3-way crossings 820 as shown in FIG. 8. For example, a 4-way crossing 810 can be turned into a sequence of 3-way crossings 820. Moreover, in this example, and shown in FIG. 3, the robot 100 is traversing a branch 316 where the turning angle is larger than 90°. However, in a situation where the turning angles is smaller than 90° can always be avoided by performing a two-step maneuver in which two obtuse-angle crossings are overcome instead of one acute-angle crossing. Nevertheless, with the technique shown in FIG. 8, all the resulting crossing angles can be made strictly larger than 90°. Furthermore, the SlothBot 400, in this example, traversing crossings with 3 wire branches, allows the synthesis of a motion control law that can be suitable for navigating over meshes of wires, as will be explained further in Section III.

C. Hardware Architecture

A prototype of the SlothBot 400 has been realized using rapid prototyping technologies. All the main components are 3D printed using standard PLA material. The printing time of an entire SlothBot 400 is about 30 hours using a commercial 3D printer. Assembly time is 30 minutes since all the other components are off-the-shelf. The realized prototype of the SlothBot 400 is 25.5 cm long, 11.2 cm high (13.5 cm with solar panels) and 6 cm wide (31.2 cm with solar panes). The 2 motors are Micro Metal Gear motors, operating at 6V, with 1000:1 reduction ratio, maximum speed of 32 rpm and maximum torque of 0.88 Nm, which allow the SlothBot 400 to move at a maximum speed of 5 cm/s. The servo motors used to rotate the spur gears are standard 9-gram servo motors with an operating voltage of 5V and a maximum torque of 0.16 Nm. The servo motor used to actuate the hinge between the two segments, required during the wire-switching maneuver, has a maximum torque of 1.52 Nm while operating at 5V. The robot is powered by a rechargeable 7.4V 1000 mAh LiPo battery. Two solar panels 420 (visible in FIG. 4), mounted on the sides of the SlothBot 400, are used to recharge the battery when the light intensity is high enough. A maximum power point transfer (MPPT) solar charging circuit is used to regulate the charging current based on the solar cell characteristics. This way, the power efficiency, expressed as the ratio between the power that is transferred to the battery and the power received from the sun, is maximized at each time instant.

The main processing unit onboard the SlothBot 400 is the ESP32, an IoT-enabled microcontroller. The microchip directly controls all the 5 servo motors, and, through a dedicated motor controller, the 2 DC motors that drive the tires. The SlothBot 400 is designed to carry sensors for environmental monitoring applications. In Section IV we show the results of a 1-day experiment during which the SlothBot 400 measured its environment's temperature and luminosity. The ESP32 connects to the sensors using the $I^2C$ protocol, usually available on sensor data acquisition boards. Moreover, the microcontroller hosts a web server which handles requests of sensor data by a client running on a desktop computer responsible for storing the collected measurements, thus enabling remote environmental monitoring.

The next section is dedicated to the motion control of the SlothBot 400 on a mesh of wires. Control laws will be introduced, which are suitable to control the robot to achieve environmental monitoring tasks.

III. Motion Planning and Control

In this example, we are interested in synthesizing a control law for the SlothBot 400 that will allow it to move on the wires to monitor events and collect data in the environment. To this end, we assume, from now on, that the mesh of wires is planar and known a priori by the robot. Then, let $X \subset \mathbb{R}^2$ be a closed and convex polygon, representing the environment in which the robot is deployed. Provided that there is no slip between the driving tires of the robots and the wires, we can assume that, by acting on the torque $\tau$ of the two DC motors, we can control the speeds $\omega_f$ and $\omega_r$ (FIG. 6) to regulate the robot to a desired velocity. The simplified robot model is then given by:

$$\dot{x} = u, \qquad \text{Equation 3}$$

where $x \in X$ is the robot position and $u \in \mathbb{R}^2$ is the velocity control input. In the environment X there are wires, that are represented by line segments, on which the robot can move.

In this context, an environmental monitoring task for the SlothBot 400, consists of driving as close as possible to a location $p(t) \in X$, that moves in space over time, in order to collect measurements. Motion planning algorithms for wire-traversing robots can use graph or road-map search to find a path to a goal point on the graph. Given that the graph is known, once the route to the goal location on the graph is planned, the robot is driven by a lower level controller to the goal. However, in order to derive a continuous-time control law that will continuously drive the robot to the point on the wires closest to p(t), we proceed as follows.

We define the task of getting to a point on the wires closest to a given location p(t) as the following constrained optimization problem:

$$\min_{x \in X} \frac{1}{2} \|x - p(t)\|_2^2 \text{ s.t. } x \in \mathcal{G}, \qquad \text{Equation 4}$$

where G denotes the mesh of wires, or, more precisely, the set of points in X that belong to the line segments defining the wires. A motion control algorithm, which allows to continuously map the velocities of an unconstrained robot onto the velocities of a robot constrained to move on wires, is formulated. With this in mind, we can then solve the unconstrained optimization problem $$\min_{q \in X} \frac{1}{2} \|q - p(t)\|_2^2 \qquad \text{Equation 5}$$

using the gradient flow method, obtaining:

$$\dot{q} = -\left(\frac{\partial}{\partial q} \frac{1}{2} \|q - p(t)\|_2^2\right)^T = p(t) - q. \qquad \text{Equation 6}$$

At this point, we can map $\dot{q}$ onto the wires obtaining $\dot{x}$. The expression of the mapping from the unconstrained velocity, $\dot{q}$, to the constrained one, $\dot{x}$, as formulated, becomes significantly simpler when the robot moves on triangle meshes of wires. Since triangle meshes only contain 3-way crossings, they are extremely suitable for the design of the SlothBot 400. The resulting control law is given by the expression $$u = \dot{x} = \dot{q}^{\tilde{M}(t)}, \qquad \text{Equation 7}$$

where $\dot{q}^{\tilde{M}(\tau)}$ is the velocity $\dot{q}$ mapped onto the wires, which brings the robot to a point on the wires that is closest to p(t). The mapping $\tilde{M}(\tau)$ is referred to as a continuous-onto-wires mapping, which depends on the geometry of the environment and the arrangement of the wires in it.

Figure 9:
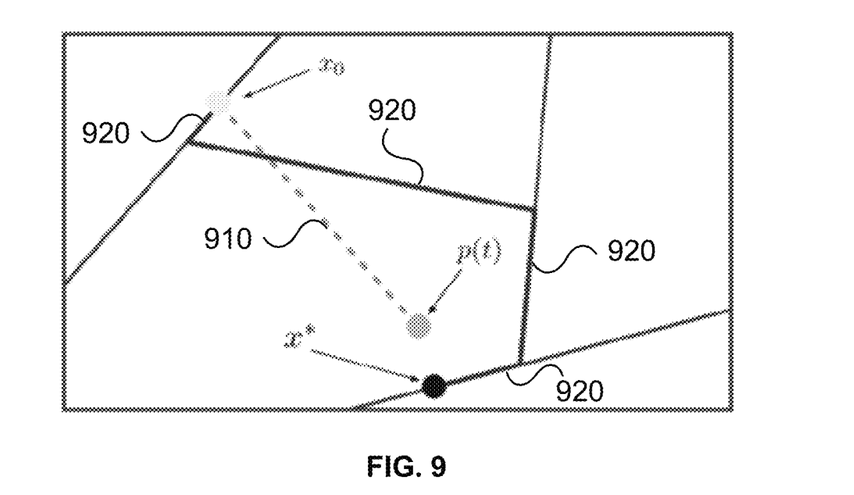
FIG. 9 provides a monitoring application, in accordance with an exemplary embodiment of the present disclosure.

FIG. 9 schematically depicts the monitoring scenario described FIG. 5 formulated in terms of the quantities introduced in this section. The robot, initially positioned at $x_0$ has to go and collect measurements at location denoted by p(t). Since it is constrained to move on the wires, a continuous projection of the unconstrained path 910 (dotted line) onto the wires is generated using Equation 7, resulting in the constrained path 920. Following this projected path, the robot arrives at location x*, that is the point on the wires closest to p(t).

IV. Experiments

Figure 10:
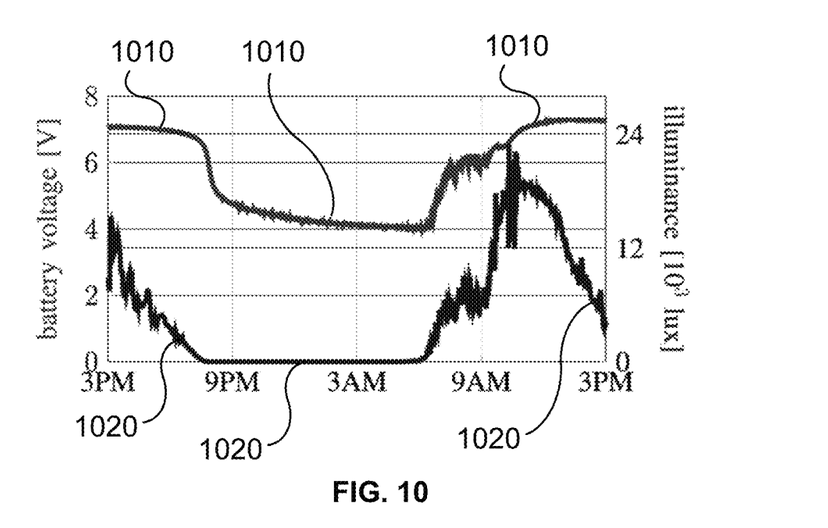
FIG. 10 provides voltage and light intensity data, in accordance with an exemplary embodiment of the present disclosure.

To show the effectiveness of SlothBot 400, we performed a long-term monitoring experiment during which we left the robot in the environment for 24 hours. As the SlothBot 400 uses solar power to recharge its battery, we equipped it with a luminosity sensor and recorded sun light intensity together with battery voltage data which will be useful for identifying the dynamical model of the battery. This model can be incorporated in the control framework to prevent the robot from completely discharging its battery. We report the collected battery voltage 1010 and light intensity data (illuminance) 1020 in FIG. 10.

V. Conclusions

In this example we have presented the SlothBot 400, a novel design of a robot that is able to traverse a mesh of wires by switching between different branches. Both the locomotion and, in particular, the wire-switching maneuvers are executed using a simple actuation mechanism, which, nevertheless, results in fail-safe executions. The SlothBot 400, in fact, remains firmly hung on the wires even in case of failure of all its actuators.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A robot comprising:
   a body;
   a processor; and
   a memory, the memory comprising instructions that, when executed by the processor, cause the body to:
      engage a first wire to support the robot from the first wire;
      traverse the first wire;
      engage a second wire simultaneously while engaging the first wire, the second wire branching from the first wire;
      after engaging the second wire, disengage the first wire; and
      traverse the second wire.

2. The robot of claim 1, wherein the body comprises one or more body segments, each of the one or more segments comprising a wire-switching system, the wire-switching system comprising a first gear comprising:
   an outer perimeter having a circumferential gap;
   an interior cavity configured to receive the first and second wires; and
   a channel connecting the circumferential gap to the interior cavity, the channel configured to allow the first and second wires to exit the interior cavity.

3. The robot of claim 2, wherein the wire-switching system further comprises:
   a second gear having an outer perimeter configured to mesh with the outer perimeter of the first gear; and
   a gear motor configured to actuate the second gear.

4. The robot of claim 2, wherein the first gear is configured to move between a top opening position, a left opening position, and a right opening position,
   wherein the memory further comprises instructions that, when executed by the processor, cause:
      the first gear to be at the top opening position when traversing the first wire;
      the first gear to be at the right opening position to disengage the first wire, if the second wire branches from the first wire from a left side of the first wire relative to a direction the robot is traversing the first wire;
      the first gear to be at the left opening position to disengage the first wire, if the second wire branches from the first wire from a right side of the first wire relative to a direction the robot is traversing the first wire; and
      the first gear to be at the top opening position when traversing the second wire.

5. The robot of claim 2, wherein the one or more body segments comprises a first body segment attached to a second body segment by an actuated hinge, the actuated hinge configured to align the first and second body segments with one or more wires currently being traversed by the robot.

6. The robot of claim 2, wherein the first gear is a C-shaped gear.

7. The robot of claim 2, wherein the circumferential gap is 15-25 degrees.

8. The robot of claim 1, further comprising:
   a drive motor; and
   a wheel,
   wherein the drive motor is configured to drive the wheel and the wheel is configured to engage with a wire to allow the robot to traverse the wire.

9. The robot of claim 1, wherein the first and second wires are suspended.

10. The robot of claim 1, further comprising a transceiver configured to communicate with one or more external devices.

11. A method of operating a robot to traverse a system of wires, the method comprising:
    engaging, with a body of the robot, a first wire;
    traversing, with the body of the robot, the first wire;
    engaging, with the body of the robot, a second wire simultaneously while engaging, with the body of the robot, the first wire, the second wire branching from the first wire;
    after engaging, with the body of the robot, the second wire, disengaging, with the body of the robot, the first wire; and
    traversing, with the body of the robot, the second wire.

12. The method of claim 11, wherein the body of the robot comprises one or more body segments, each of the one or more body segments comprising a wire-switching system, the wire-switching system comprising a first gear comprising:
    an outer perimeter having a circumferential gap;
    an interior cavity; and
    a channel connecting the circumferential gap to the interior cavity.

13. The method of claim 12, wherein engaging the first wire comprises receiving the first wire into the interior cavity of the first gear,
    wherein engaging the second wire comprises receiving the second wire into the interior cavity of the first gear, and
    wherein disengaging the first wire comprises passing the first wire from the interior cavity, through the channel, through the circumferential gap, and to an area external to the outer perimeter of the first gear.

14. The method of claim 13, wherein the first gear is movable between a top opening position, a left opening position, and a right opening position,
    wherein when traversing the first wire, the first gear is at the top opening position,
    wherein disengaging the first wire comprises moving the first gear from the top opening position to the right opening position when the second wire branches from the first wire from a left side of the first wire relative to a direction the robot is traversing the first wire, and
    wherein disengaging the first wire comprises moving the first gear from the top opening position to the left opening position when the second wire branches from the first wire from a right side of the first wire relative to a direction the robot is traversing the first wire,
    the method further comprising, prior to traversing the second wire, moving the first gear from one of the left opening position and the right opening position to the top opening position.

15. The method of claim 14, wherein the wire-switching system further comprises a second gear having an outer perimeter meshing with the outer perimeter of the first gear, wherein moving the first gear from the top opening position to the right opening position comprises actuating the second gear, and wherein moving the first gear from the top opening position to the left opening position comprises actuating the second gear.

16. The method of claim 12, wherein the one or more body segments comprises a first body segment attached to a second body segment by an actuated hinge, wherein the method further comprises actuating the actuated hinge to align the first and second body segments with the first and/or second wires currently being traversed by the robot.

17. The method of claim 11, wherein the first and second wires are suspended.

18. The method of claim 11, further comprising communicating, with the robot, with one or more external devices.

19. A robot comprising:
a body comprising one or more body segments, each of the one or more body segments comprising a wire-switching system, the wire-switching system comprising:
a first gear comprising:
an outer perimeter having a circumferential gap;
an interior cavity configured to receive a first wire and a second wire; and
a channel connecting the circumferential gap to the interior cavity, the channel configured to allow the first and second wires to exit the interior cavity;
a second gear comprising:
an outer perimeter configured to mesh with the outer perimeter of the first gear; and
a gear motor configured to actuate the second gear;
a processor; and
a memory, the memory comprising instructions that, when executed by the processor, cause the body to:
engage the first wire to support the robot from the first wire;
traverse the first wire;
engage the second wire simultaneously while engaging the first wire, the second wire branching from the first wire;
after engaging the second wire, disengage the first wire; and
traverse the second wire.

20. The robot of claim 19, wherein the second gear is configured to actuate the first gear between a top opening position, a left opening position, and a right opening position,
wherein the memory further comprises instructions that, when executed by the processor, cause:
the first gear to be at the top opening position when traversing the first wire;
the second gear to actuate the first gear to the right opening position to disengage the first wire, if the second wire branches from the first wire from a left side of the first wire relative to a direction the robot is traversing the first wire;
the second gear to actuate the first gear to the left opening position to disengage the first wire, if the second wire branches from the first wire from a right side of the first wire relative to a direction the robot is traversing the first wire; and
the second gear to actuate the first gear to the top opening position to traverse the second wire.

* * * * *